UNITED STATES PATENT OFFICE.

LEOPOLD C. DEWILLERS, OF BROOKLYN, ASSIGNOR OF ONE-HALF TO PAULIN FLOQUET, OF NEW YORK, N. Y.

COMPOSITION FOR SOFTENING AND RENOVATING LEATHER.

SPECIFICATION forming part of Letters Patent No. 381,680, dated April 24, 1888.

Application filed May 24, 1887. Serial No. 239,224. (No specimens.)

*To all whom it may concern:*

Be it known that I, LEOPOLD C. DEWILLERS, a citizen of France, residing in Brooklyn, in the county of Kings and State of New York, have invented a new and Improved Composition of Matter, of which the following is a full, clear, and exact description.

My invention relates to a composition of matter for preserving and softening all varieties of leather, especially kids of black dye, which have been hardened by use or through other means, and has for its object to provide an efficient means of rendering leather soft and pliable, and also to provide a thorough renovator, which when applied will not only act in the capacity of a cleaner, but will also prevent the leather from cracking and counteract the influence of salt-water, snow, or dampness.

The invention consists in the following ingredients, combined in substantially the proportions stated, viz: soft water, six quarts; salts of sorrel, one one-hundredths of a pound; white castile-soap free from potash, five pounds; olive-oil, three quarts; spirits of ammonia, (22°,) one gill.

The salts of sorrel are dissolved in six quarts of boiling water, and the castile-soap is then added and allowed to thoroughly dissolve. When the salts and soap have completely dissolved in the hot water, the oil and ammonia are poured in and the compound is thereupon kept stirring until perfectly cold.

By the use of pure olive-oil the finest grade is produced, purposed for use on fine black kid, skins, or gloves, or black leathers. For indifferent kid or common leather—such as is used in shoes, harness, &c.—a low grade may be employed with good effect, which is accomplished by substituting for the olive-oil common oils—such as cotton-seed oil—or any kind of fat with the exception of tallow.

It will be observed that my paste is adapted for use especially upon leather of black dye, as a restorer, when hardened from any cause, and consequently is free from potash or soda, the same having a tendency to harden the leather, which is not hardened in the black dye owing to the free use of copperas.

Having thus described my invention, what I claim as new, and desire to secure by Letters Patent, is—

The herein described composition of matter for softening and renovating leather, which consists of soft water, salts of sorrel, castile-soap free from potash, oil, and ammonia, combined in substantially the proportions stated.

LEOPOLD C. DEWILLERS.

Witnesses:
CLARENCE L. BURGE,
C. SEDGWICK.